June 2, 1970        J. BAUMOEL        3,515,000

LIQUID GAUGE

Filed Aug. 6, 1968        2 Sheets-Sheet 1

INVENTOR.
JOSEPH BAUMOEL
BY
OSTROLENK, FABER, GERB & SOFFEN
ATTORNEYS

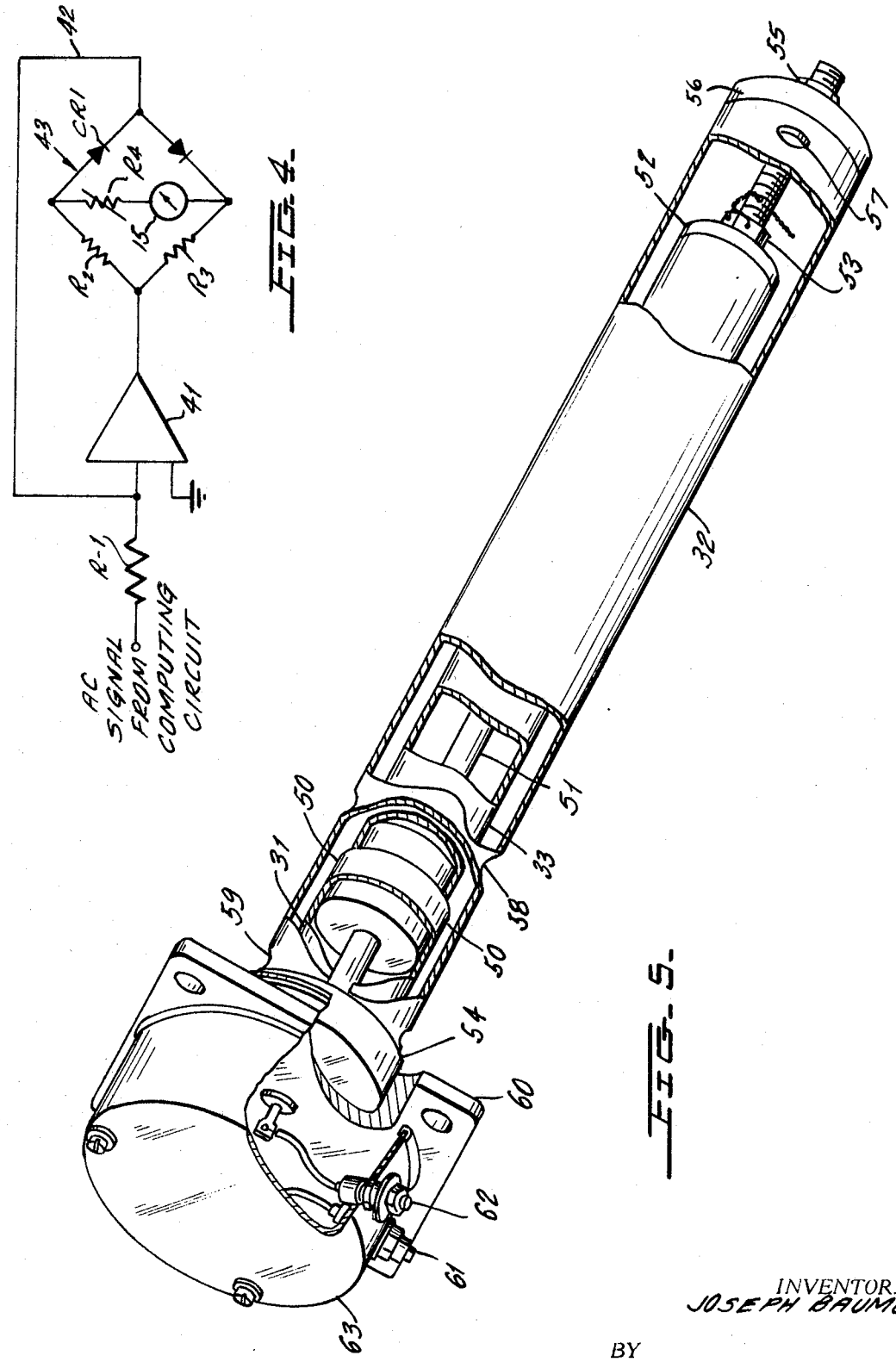

United States Patent Office

3,515,000
Patented June 2, 1970

3,515,000
LIQUID GAUGE
Joseph Baumoel, Jericho, N.Y., assignor to Controlotron Corporation, Farmingdale, N.Y., a corporation of New York
Filed Aug. 6, 1968, Ser. No. 750,601
Int. Cl. G01f 23/26
U.S. Cl. 73—304     3 Claims

ABSTRACT OF THE DISCLOSURE

A liquid gauge is provided with a measuring probe and a reference probe both immersed in the same liquid whose level is to be measured whereby the impedance between the measuring and reference probes and a common electrode are determined by the electrical properties of the same liquid, and by the area of each probe immersed in the liquid. The measuring probe is connected in the input circuit of an operational amplifier and the reference probe is connected in the feedback circuit of the operational amplifier thereby giving the operational amplifier a gain equal to the ratio of the impedance between the reference probe and common electrode to the impedance between the measuring probe and the common electrode. This ratio directly indicates the level of liquid independent of the electrical properties of the liquid.

Background of the invention

The present invention is concerned with liquid gauges and is more particularly concerned with the provision of an impedance sensing liquid gauge especially suitable for use as an oil or fuel gauge in aircraft and other circumstances in which environmental conditions change to a great degree thereby affecting the electrical properties of the liquid or fuel.

Fuel and oil gauges for use in aircraft and other environments require a high degree of mechanical reliability and accuracy of measurement. In the past mechanical reliability has been achieved by the elimination of mechanically movable parts in the liquid gauge and by the replacement of these parts with a capacitance system which measures the level of fuel, oil or other liquid in a tank or reservoir as a function of the capacitance of a probe inserted in the tank. Capacitance systems generally include a measuring probe having a pair of plates vertically oriented in the tank so that the capacitance between the plates will vary in accordance with the level of fluid in the tank between the plates. The plates are typically connected in a bridge circuit having an electrical input signal to the bridge and an electrical output signal for operating an indicator. The electrical output signal is related to the difference in current through the arms of the bridge.

The capacitance system is fine for the measurement of the liquid in the tank where the environmental conditions remain relatively static and where the liquid is "capacitive." However, in environments such as those presented in the use of aircraft, fluctuations in temperature may be great and contamination of the liquid may also be great. As a result, the electrical properties of the liquid can vary to a great degree and the capacitance as well as the resistance between the two plates of the measuring probe will vary. The variations of the resistance properties are usually quite large and the result is that the output current of the bridge may present an inaccurate indication of the level of liquid in the tank.

Attempts have been made to correct the above problems in the capacitance system liquid gauge by providing phase discrimination between the resistive and capacitive voltages since it is basically the resistive voltage which leads to the inaccuracies of the above systems. Since the resistive and capacitive voltages are 90° out of phase with each other, phase discrimination should be able to eliminate the resistive component. These attempts, however, have not met with a great degree of success. Phase discrimination permits a portion of the resistive voltage to add or subtract from the desired phase discriminated output current due to unavoidable circuit phase shifts. Since the resistive current is generally very large, the errors thus produced can be many times greater than the capacitance signal current. The result is that the capacitance systems even with phase discrimination are considerably inaccurate.

It is the purpose of the present invention, therefore, to provide a liquid gauge having the mechanical advantages of the capacitance system above described and electrical characteristics such that the system remains accurate throughout wide variations in the electrical properties of the liquid due to variations in temperature and contamination. The present invention accomplishes these purposes by the provisions of a new and novel impedance system liquid gauge. One preferred embodiment of the instant invention includes a sensing unit having a common plate or electrode, a reference probe and a measuring probe. The measuring probe and the common electrode are in the input circuit to an operational amplifier and the reference probe and common electrode are in the feedback circuit of the operational amplifier. The impedance in the input circuit between the measuring probe and the common electrode, hereafter called the measuring impedance, will be a function of the level of liquid in the tank in which the probe is immersed and the particular characteristic of the liquid. The feedback or reference impedance will be a function of the characteristics of the same liquid since the reference probe is immersed in the same liquid as the measuring probe. The gain of the operational amplifier connected in this manner will be equal to the ratio of the reference impedance to the measuring impedance. Since both impedances are products of the electrical impedance of the same liquid, the ratio will be independent of the electrical impedance of the liquid and and it will merely indicate the ratio of the surface areas of the measuring and reference probes immersed in the liquid. This ratio is a function of the level of liquid in the tank or reservoir. As a result of this relationship produced by the operational amplifier, an input voltage to the operational amplifier will produce an output voltage representative of the liquid level. This output may then be connected directly to a calibrated measuring circuit and indicator to directly indicate the level of liquid in the tank. Even though variations of the absolute impedance of the oil may be a factor of 100 to 1 due to changes from low conductivity at high temperatures and contamination, the ratio of reference impedance to measuring impedance will be independent of such variations and the calibrations will remain accurate.

It is, therefore, one object of the instant invention to provide a liquid gauge employing an operational amplifier connected to reference and measuring probe elements immersed in the liquid to be measured for eliminating any inaccuracies caused by the variations in the electrical properties of the liquid.

It is another object of the instant invention to provide a liquid gauge having all the structural advantages of the capacitance system liquid gauges and eliminating their disadvantages resulting from their susceptibility to inaccuracies due to changes in environmental conditions.

It is a further object of the instant invention to provide a liquid gauge particularly suitable as an oil gauge in aircraft where temperature variations may be very great and the oil may become highly contaminated.

It is another object of the instant invention to provide a liquid gauge having an indicator which may be calibrated initially to indicate the level of liquid or percentage fullness of a tank without thereafter having to recalibrate the indicator as a result of changes in the electrical properties of the liquid.

Another object of the instant invention is to provide a liquid gauge having the characteristics of being intrinsically self-compensating and having an accuracy of the order of 1% over a wide range of temperature and contamination conditions.

A further object of the instant invention is to provide a liquid gauge which produces an electrical signal directly indicating the level of liquid in a tank or the percentage fullness of the tank.

The above objects, features and advantages of the instant invention along with other objects, features and advantages will become apparent upon a reading of the following description of a preferred embodiment of the instant invention in conjunction with the drawings as follows:

FIG. 4 is a schematic diagram of a meter rectifier circuit suitable for use in the liquid gauge of the instant invention.

FIG. 5 is a perspective view of the probe sensing unit to be employed in the liquid gauge of the instant invention.

Figure 1:
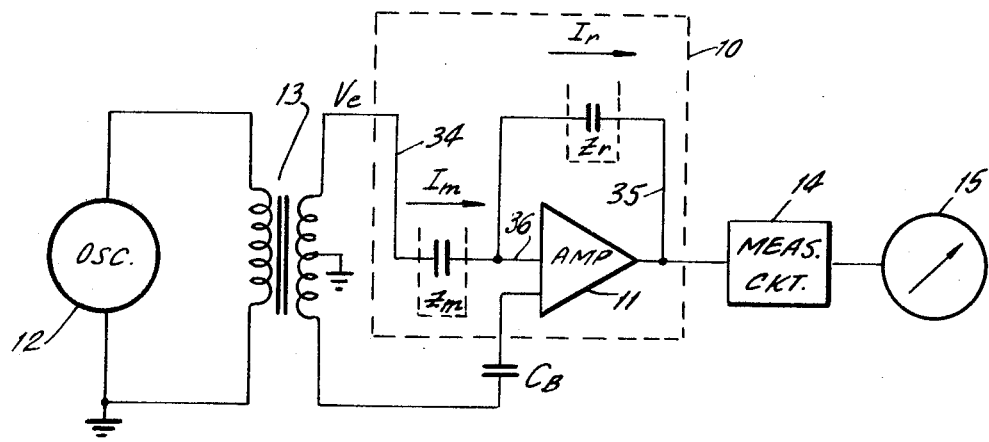
FIG. 1 is a schematic diagram of the electrical circuit of the liquid gauge of the instant invention.

Referring first to FIG. 1, there is shown a schematic diagram of the electrical circuitry of the liquid gauge of the instant invention. This circuit includes an operational amplifier generally designated as 10 comprised of an amplifier 11, a measuring impedance $Z_m$ connected in the input circuit of the amplifier 11, and a reference impedance $Z_r$ connected in the feedback circuit of the amplifier 11.

Figure 3:
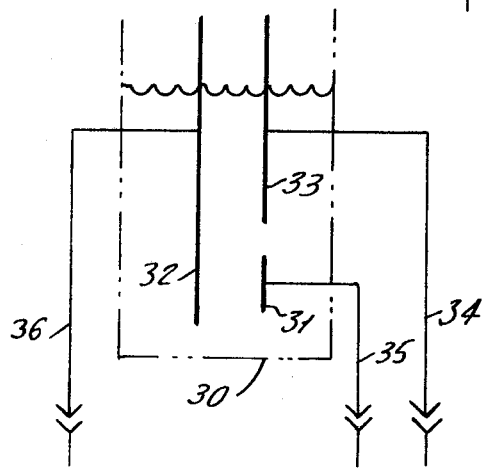
FIG. 3 is a schematic diagram of the measuring and reference probes in an oil tank.

The reference impedance $Z_r$ is formed by a reference probe 31 and a common electrode 32 immersed in the oil tank or reservoir 30 shown in FIG. 3. The measuring impedance is formed by measuring probe 33 and the common electrode 32 immersed in the oil tank 30. The impedance between the measuring probe 33 and the common electrode 32 is inversely proportional to the level of oil in the oil tank. As the level of oil in the oil tank 30 goes down, the effective electrical coupling of the measuring probe and the common electrode is reduced since the area of the measuring probe 33 and the common electrode 32 submerged in the oil is reduced. As a result, the impedance between the measuring probe 33 and the common electrode 32 is increased. It should be recognized that the impedances between the reference probe 31 and the common electrode 32 and the measuring probe 33 and the common electrode 32 are both dependent upon the electrical properties of the oil in oil tank 30. These properties includes the dielectric constant of the oil which determines the capacitance between the probes and the common electrode and conductivity of the oil as determined by the contamination and temperature. It should be noted that the dielectric constant of oil is greater than that of air. The capacitance of the portions of the measuring probe and common electrode not in oil will be bucked out by capacitance $C_B$. The leads 34, 35 and 36 of FIG. 3 correspond to the leads with the same numbers in the schematic of the electrical circuit shown in FIG. 1.

The sensing unit including the measuring probe 33, reference probe 31 and common electrode 32 may be provided as shown in the preferred embodiment of FIG. 5. In this embodiment the common electrode 32 is concentric with the reference probe 31 and measuring probe 33, all of which are cylindrical electrodes. The sensing unit would be oriented in the tank so that reference probe 31 is at the bottom of the tank.

The reference probe 31 and measuring probe 33 are separated by insulator 50 and are mounted coaxial with compression rod 51 by means of insulator spacer 52 and compression nut 53 which hold the two probes in tandem against the tube bottom insulator 54. The common electrode 32 is similarly held coaxial with the compression rod 51 by means of compression nut 55 insulator spacer 56 and insulator 54. The common electrode 32 is provided with drainage holes such as at 57, 58 and 59 to permit the oil in the tank to fill the space between the common electrode and the reference and measuring probes to the level of oil in the tank.

The sensing unit is further provided with a base plate 60 through which the electrical leads from the common electrode, reference probe and measuring probe pass to terminals, such as 61 and 62 and a third terminal not shown in cover 63 for connection to the appropriate terminals of the circuit of FIG. 1.

Referring again to FIG. 1, the liquid gauge of the instant invention also includes oscillator 12 coupled to the input circuit of the operational amplifier 10 via transformer 13. The output of the operational amplifier 10 is connected to a measuring circuit 14 which is connected to an indicator 15. The indicator 15 is responsive to the magnitude of the rectified voltage from the operational amplifier 10, as to be explained hereinafter.

The gain (A) of operational amplifier 10 is sufficiently large (e.g. 100 db) to be represented as $$-\frac{Z_r}{Z_m}$$

For a derivation of this relationship see Pulse and Digital Circuits by Millman and Taub, McGraw-Hill, 1956, pp. 22–24. Expressed in other terms:

$$V_0 = -V_L \frac{Z_r}{Z_m} \quad (1)$$

where:

$V_L$ equals the input voltage to the operational amplifier 10 from oscillator 12;

$Z_r$ equals the reference impedance or the impedance of the oil between the reference probe 31 and the common electrode 32;

$Z_m$ equals the measuring impedance or the impedance of the oil between the measuring probe 33 and the common electrode 32; and $V_0$ equals the output voltage from the operational amplifier 10.

Expressing Equation No. 1 with the impedance converted to complex conductances, it can be shown that:

$$V_0 = -V_L \frac{G_m}{G_r} \quad (2)$$

where:

$G_m$ equals the complex conductance of the oil between the measuring probe 33 and the common electrode 32; and $G_r$ equals the complex conductance of the oil between the reference probe 31 and the common electrode 32.

Since the complex conductances $G_m$ and $G_r$ are both dependent upon the complex conductance of the oil per unit of area and the area of the measuring probe 33 and reference probe 31 immersed in the oil, these complex conductances may be expressed as follows:

$$G_m = XK'G_0 \quad (3)$$

$$G_r = K''G_0 \quad (4)$$

where:

$G_0$ equals the complex conductance of the oil per unit of area;

K' equals the entire area of the measuring probe which is immersed in the oil when the tank is full;

K'' equals the area of the reference probe which is always immersed in the oil; and X equals the percentage of the area of the measuring probe immersed in the oil or the percentage fullness of the tank.

By inserting Equations 3 and 4 into Equation 2 it can be readily seen that the following relationship results:

$$V_0 = -V_L X \frac{K'}{K''} = X(KV_L) \quad (5)$$

where:

K is a constant equal to $$-\frac{K'}{K''}$$

From Equation No. 5 it is apparent that the output voltage $V_0$ of the operational amplifier 10 is directly proportional to the percentage fullness X of the tank 30. Implementation of this expression also requires bucking out the empty capacitance of the reference capacitor, 31, which can be done by various state of the art methods.

The output voltage $V_0$ from the operational amplifier 10 is fed to a measuring circuit 14 where the voltage is rectified and to the indicator 15. The indicator 15 is calibrated taking into account the value of the constant K and the constant input voltage $V_L$ from the oscillator. The calibration will also take into account the capacitance of the portions of the measuring probe and common electrode in air as the level of oil in the tank goes down.

As can be seen from the above description of the liquid gauge of the instant invention the measurement of the percentage fullness of the tank with oil or other liquid is accomplished irrespective of changes in the electrical properties of the oil or liquid. This highly desirable result is achieved as a result of the characteristics of the operational amplifier 10 and as a result of the fact that the measuring probe and reference probe are both inserted in the same oil or liquid.

Figure 2:
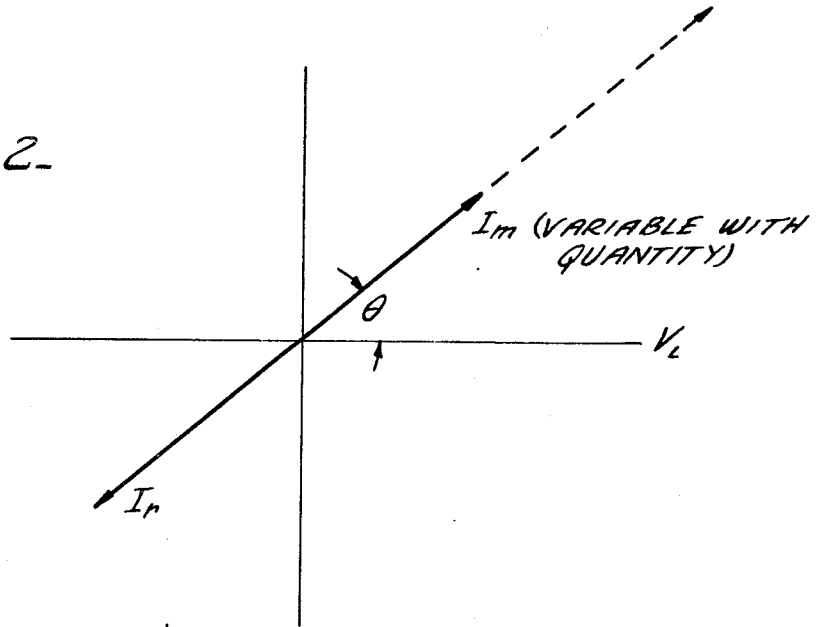
FIG. 2 is a phase diagram showing the phase relationship of the reference current and measuring current which flow through the reference impedance and measuring impedance of the liquid gauge of the instant invention.

FIG. 2 is a phase diagram showing the phase relationship of the reference current and measuring current which flow through the reference impedance and measuring impedance. The angle $\theta$ is determined by the ratio of liquid susceptance to conductivity. This angle is determined by the dielectric constant of the liquid, contamination, temperature, etc. This angle determines the resistive and capacitive components of the voltage between the measuring and reference probes and the common electrode. By use of the operational amplifier in the liquid gauge of the instant invention, this angle becomes irrelevant whereas in a capacitance system it is of great importance.

As has been mentioned previously, the operational amplifier 10 produces an AC signal proportional to the oil level in the tank 30. In order to display this oil level on a DC meter indicator such as 15 it is necessary to rectify the AC signal from the operational amplifier 10. Rectification, however, ordinarily produces a voltage subtraction due to the forward drop of the rectifiers. This subtraction error is avoided by using the measuring circuit 14 more fully shown in FIG. 4.

The measuring circuit of FIG. 4 includes a resistor R1 which is connected to the output of operational amplifier 10 of FIG. 1, a meter amplifier 41, and a rectification circuit 43 including resistors RZ, R3, and R4, and rectifiers CR1 and CR2. The meter 15 is connected in the rectification circuit 43. As shown in FIG. 4 this measuring circuit is connected as an operational amplifier with a feedback 42 connected from the junction between rectifiers CR1 and CR2 to the input of the meter amplifier 41. This feedback has the effect of dividing the rectifier forward drop by the gain of the amplifier 41. Thus, for an amplifier having a gain of 10,000, a drop of about .7 volt is reduced to about 70 microvolts.

The operation of the entire system is as follows. The oscillator 12 produces signals which is fed through transformer 13 to lead 34 of the measuring probe 33 (the signal from the oscillator may be at a frequency of 2 kHz. and of a magnitude of 2 volts). This signal to the measuring probe then causes an output voltage from the operational amplifier 10 proportional to the level of oil in the tank 30. The output voltage is AC and is fed to the measuring circuit 14 through resistor R1 and amplifier 41 and through the bridge rectification circuit 43 to cause the operation of the meter 15. It is noted that the resistor R4 in the bridge circuit 43 may be suitably adjusted to calibrate the meter 15. This adjustment may take into account any tolerance of air capacitance of the measuring and reference probe which might otherwise cause slight inaccuracies.

While the above equations and relationships have been derived on the basis of the percentage fullness of the tank being directly proportional to the level of the oil or liquid in the tank, it should be understood that this is not essential. If the percentage fullness is not directly proportional to the level of oil in the tank, the above relationships are still valid and all that is necessary is to modify the geometry of the measuring probe 33. In this manner the area of the measuring probe 33 immersed in the oil will always be equal to the same percentage of the entire measuring probe 33 as the percentage fullness of the tank.

It should be clear from the above description of the liquid gauge of the instant invention that a liquid gauge has been provided which will read out the actual degree of tank fullness regardless of the electrical properties of the liquid in the tank. Furthermore, once the gauge has been calibrated, it will properly indicate the tank fullness regardless of changes in the electrical properties due to temperature, contamination, etc. The only practical limitations on the present liquid gauge are the existence of a minimum dielectric constant which determines sensitivity limitation and the value of maximum conductivity which determines measuring probe current requirements. These two factors, however, are merely design considerations and they do not in any way limit the great advantages of the liquid gauge of the instant invention.

While the present invention has been described with respect to one preferred embodiment thereof, many modifications and variations will now become apparent to those skilled in the art.

I claim:

1. Electrical measuring apparatus for determining the percentage fullness of a reservoir containing liquid subject to temperature variation and to contamination comprising in combination sensing means adapted to be positioned within said reservoir;

said sensing means including measuring probe means extending within said liquid by an amount proportional to the fullness of said reservoir for exhibiting a first electrical impedance constituting capacitance and conductance proportional to the percentage fullness of said reservoir and dependent upon the electrical properties of the liquid within said reservoir, and reference probe means wholly within said liquid exhibiting a second electrical impedance constituting capacitance and conductance dependent upon the electrical properties of said liquid in said reservoir;

operational amplifier means having an input circuit including said measuring probe means and a feedback circuit including said reference probe means operative to produce an output signal proportional to the ratio of said second impedance to said first impedance and thereby representative of the percentage fullness of said liquid reservoir as compensated for by the electrical properties of the liquid;

said operational amplifier being electrically connected to an indicator for indicating the percentage fullness of said liquid reservoir; and rectification means connected to said operational amplifier and said indicator for rectifying the output signal from said operational amplifier; said rectification means including means for reducing the forward voltage drop of said rectification means.

2. The electrical measuring apparatus of claim 1 wherein said measuring probe means includes a measuring probe and a common electrode; said first electrical impedance being measured between said measuring probe and said common electrode; and said reference probe means includes a reference probe and said common electrode; said second electrical impedance being measured between said reference probe and said common electrode.

3. The electrical measuring apparatus of claim 2 further including an oscillator electrically connected to said measuring probe for providing an input signal to said operational amplifier.

References Cited

UNITED STATES PATENTS 2,908,166   10/1959   Johnson.
3,221,247   11/1965   Samuelian _____ 324—61
3,285,068   11/1966   Morris.

LOUIS R. PRINCE, Primary Examiner

H. C. POST III, Assistant Examiner